(12) United States Patent
Bacquet et al.

(10) Patent No.: US 9,256,820 B2
(45) Date of Patent: Feb. 9, 2016

(54) DATA TRANSFER SYSTEM AND ASSOCIATED MANAGEMENT METHOD

(75) Inventors: Sylvain Bacquet, Chasselay (FR);
Elisabeth Crochon, Poisat (FR);
Thierry Thomas, Varces Allieres et Risset (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 853 days.

(21) Appl. No.: 13/417,643

(22) Filed: Mar. 12, 2012

(65) Prior Publication Data
US 2012/0238899 A1    Sep. 20, 2012

(30) Foreign Application Priority Data

Mar. 15, 2011 (FR) ..................... 11 52124

(51) Int. Cl.
| | |
|---|---|
| G06K 19/07 | (2006.01) |
| G06K 7/00 | (2006.01) |
| G06K 7/10 | (2006.01) |
| H04L 12/24 | (2006.01) |
| H04L 12/66 | (2006.01) |

(52) U.S. Cl.
CPC .......... *G06K 19/0707* (2013.01); *G06K 7/0008* (2013.01); *G06K 7/10207* (2013.01); *G06K 19/0704* (2013.01); *G06K 19/0723* (2013.01); *H04L 12/66* (2013.01); *H04L 41/0213* (2013.01)

(58) Field of Classification Search
CPC ..... H04L 29/06; H04L 12/66; H04L 41/0213; G06K 17/0022; G06K 19/0707; G06K 7/0008
See application file for complete search history.

(56) References Cited

U.S. PATENT DOCUMENTS

| | | | | | |
|---|---|---|---|---|---|
| 5,896,561 | A | * | 4/1999 | Schrader et al. | 455/67.11 |
| 6,836,803 | B1 | * | 12/2004 | Swartz et al. | 709/227 |
| 7,580,380 | B2 | * | 8/2009 | Baker et al. | 370/310 |
| 7,606,575 | B2 | * | 10/2009 | Mahany et al. | 455/452.2 |
| 8,327,396 | B2 | * | 12/2012 | Ramaswamy et al. | 725/19 |
| 2003/0017804 | A1 | | 1/2003 | Heinrich et al. | |
| 2011/0025462 | A1 | | 2/2011 | Stern et al. | |

FOREIGN PATENT DOCUMENTS

WO    WO 2010/028092 A1    3/2010

* cited by examiner

*Primary Examiner* — Max Hindenburg
(74) *Attorney, Agent, or Firm* — Occhiuti & Rohlicek LLP

(57) ABSTRACT

A method for managing a data transfer system includes recovering energy at peripheral devices, and wireless transfer recovered energy to a base by synchronizing RF signals transmitted by double-loop antennas. Synchronizing includes implementing a listening phase to detect a radio-frequency signal transmitted by said central base, and either sending an RF signal that is synchronous with the detected signal or transmitting a signal at a predetermined frequency depending on whether an RF signal is detected at the base. The method includes, in response to receiving a signal from the peripheral device at that frequency, causing the base to recover the received signal and to re-transmit at the predetermined frequency to the peripheral devices. This signal synchronization enables simultaneous energy transfer from peripheral devices to the central base while avoiding mutually destructive effects between said signals.

16 Claims, 9 Drawing Sheets

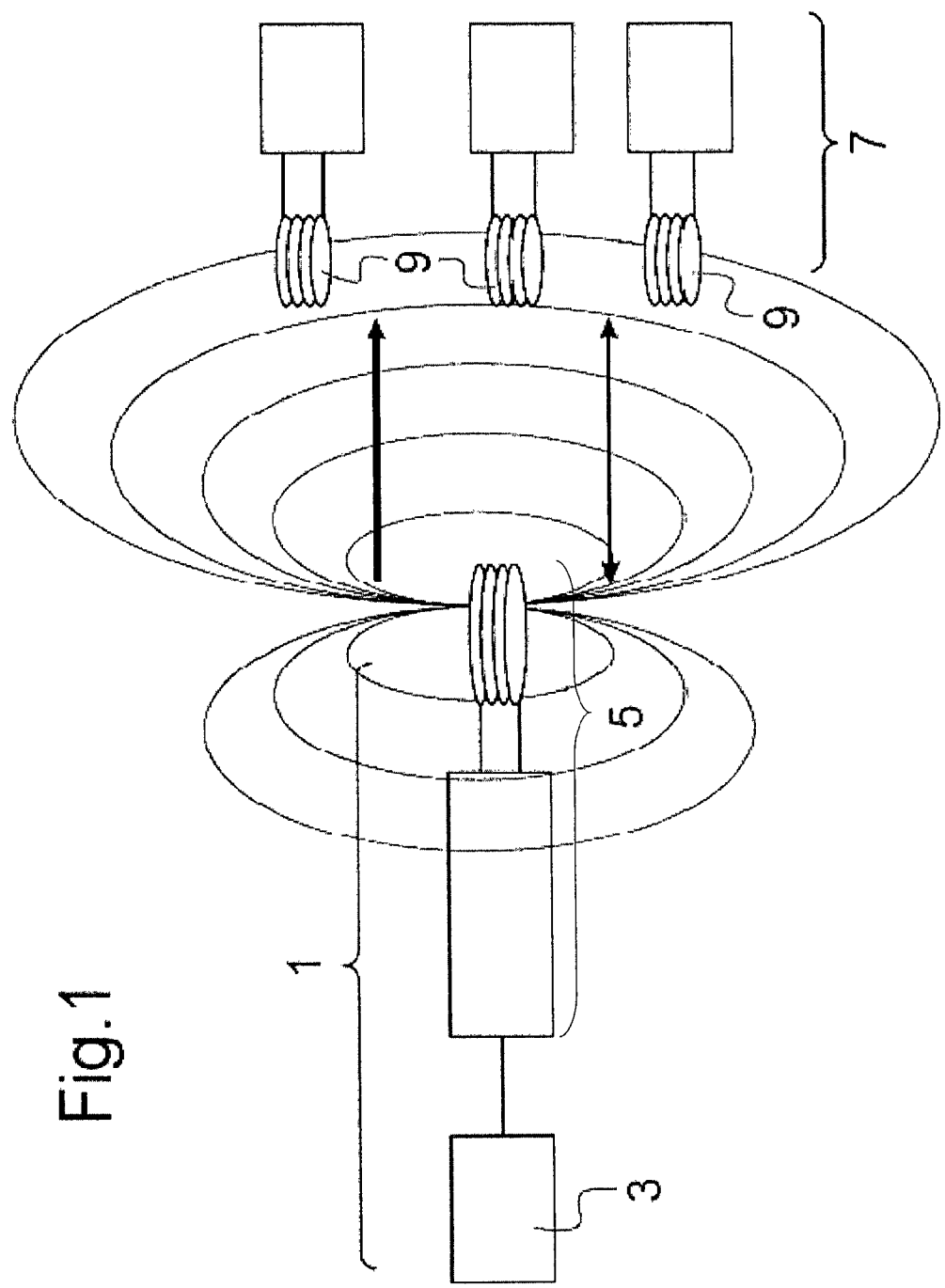

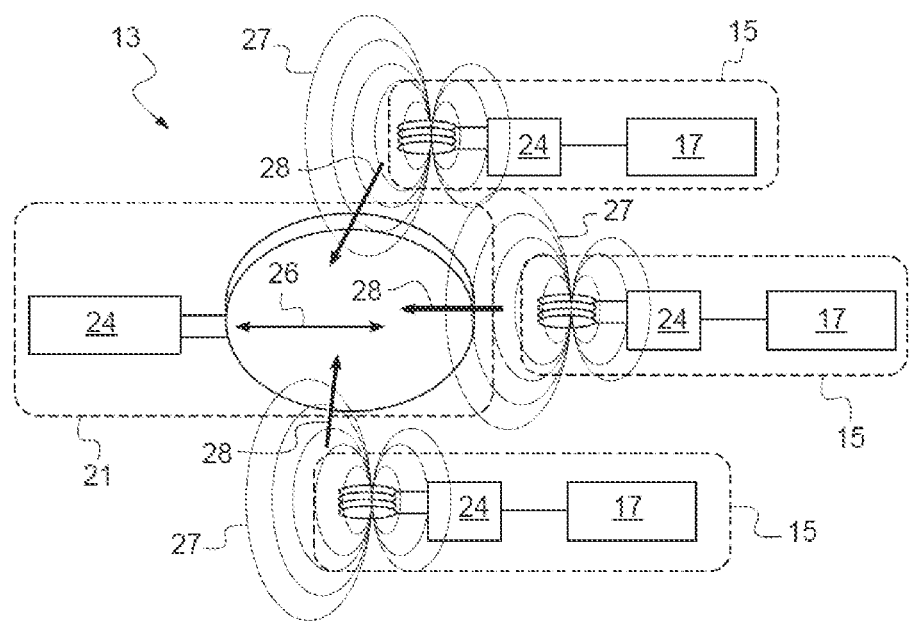

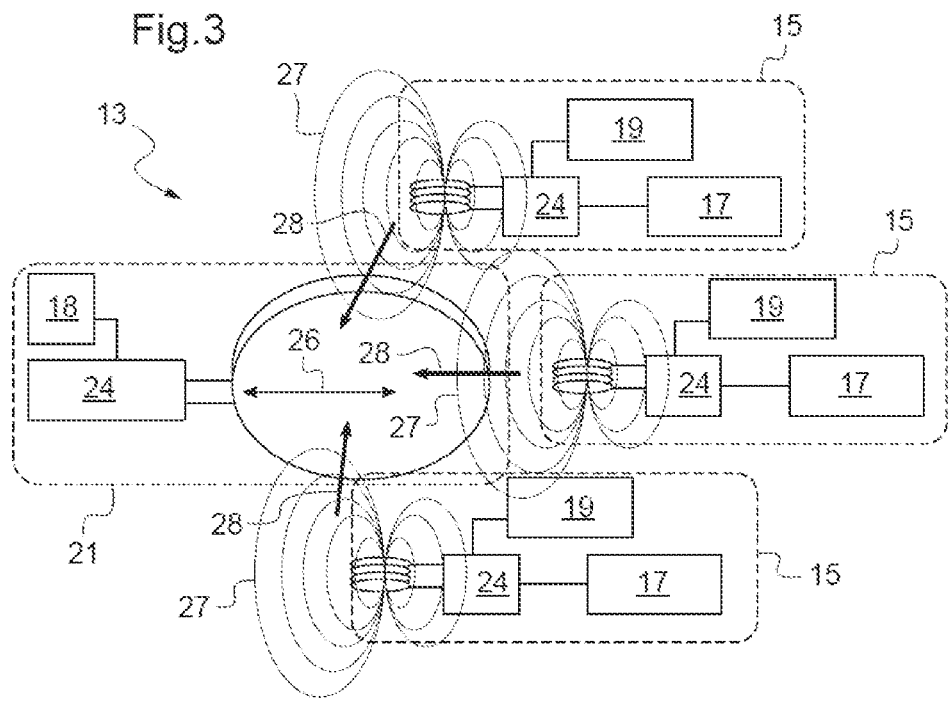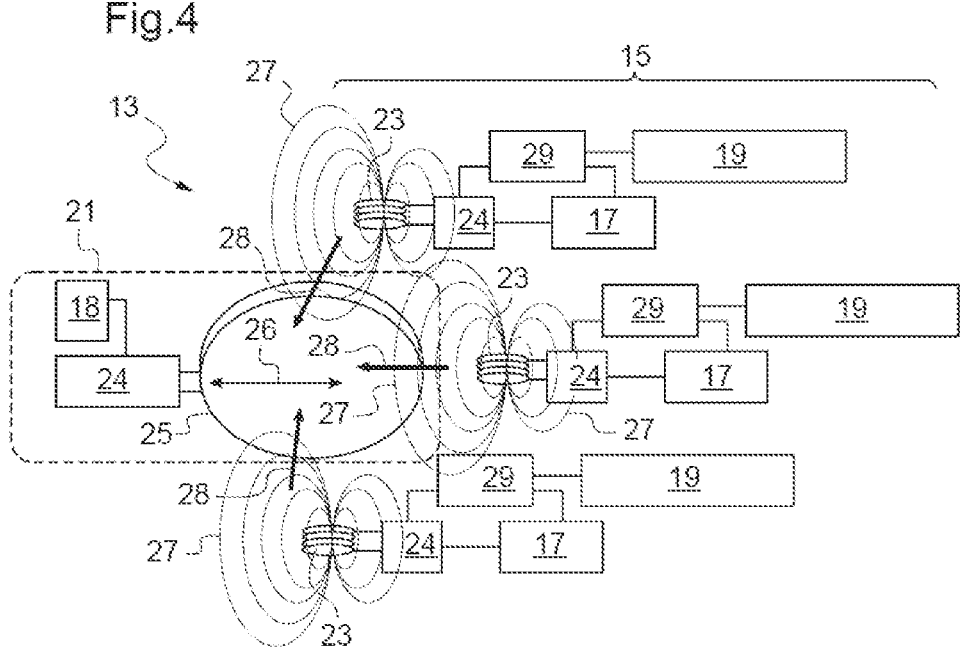

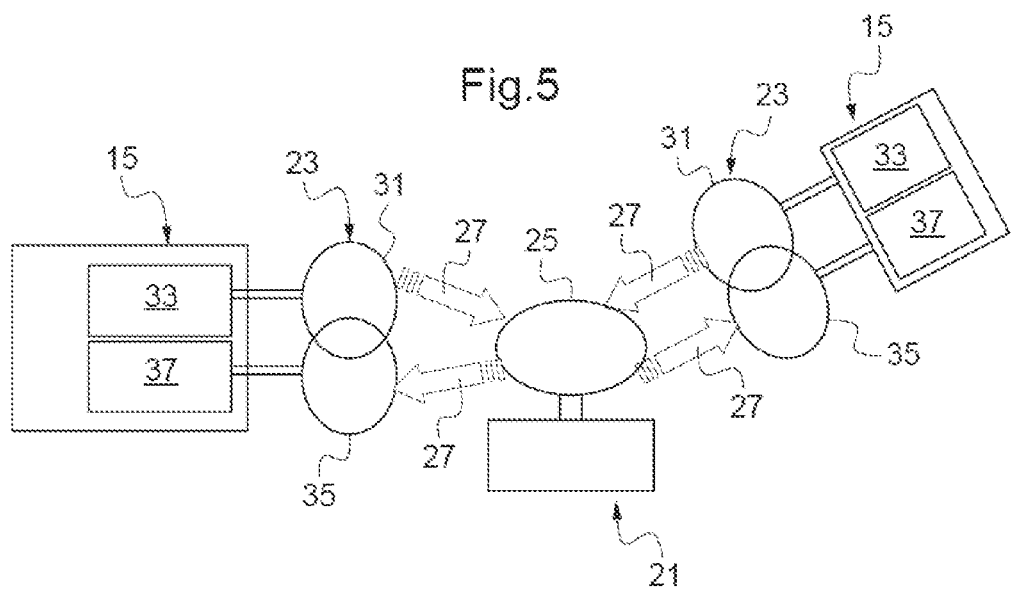
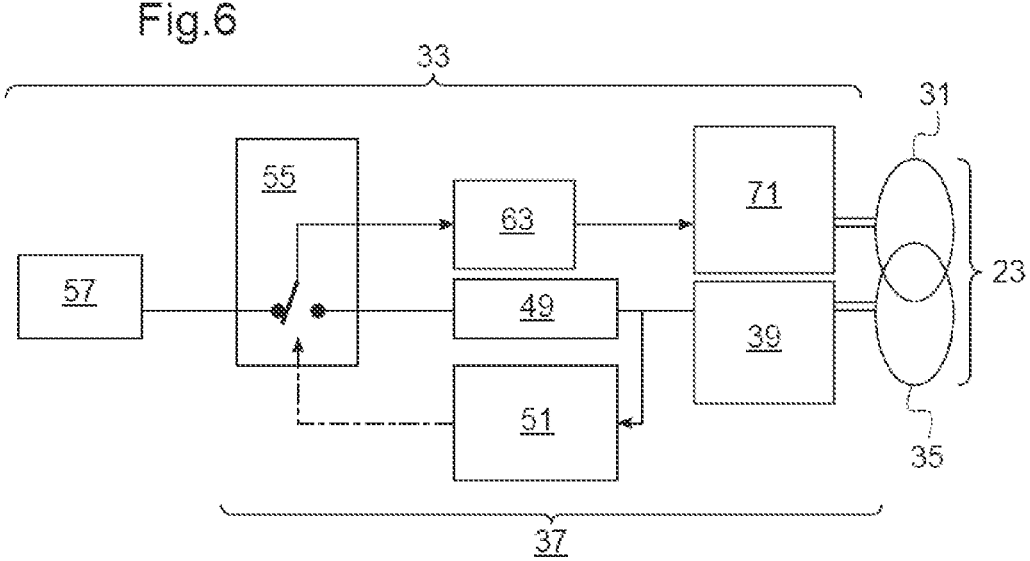

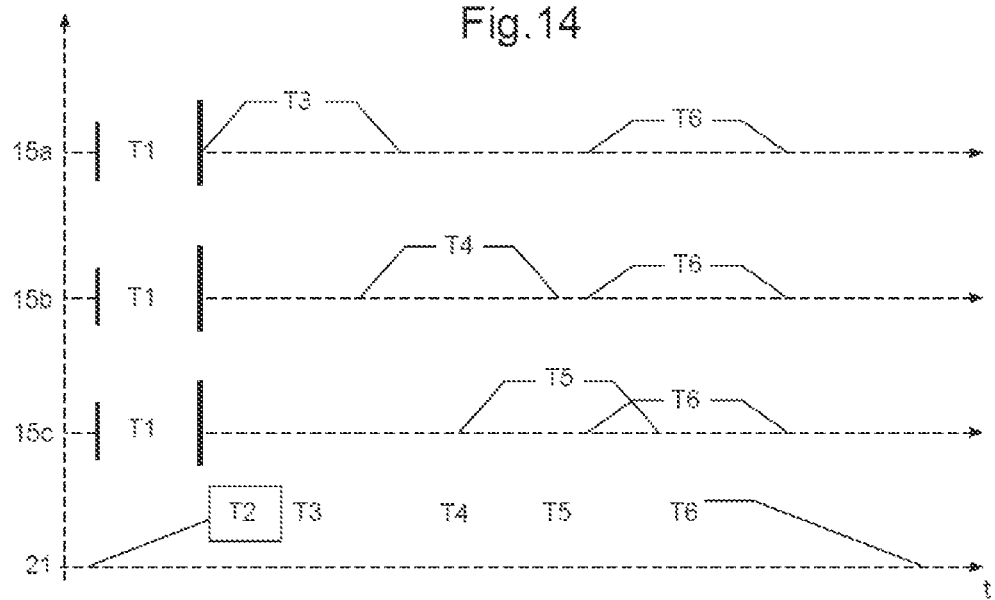
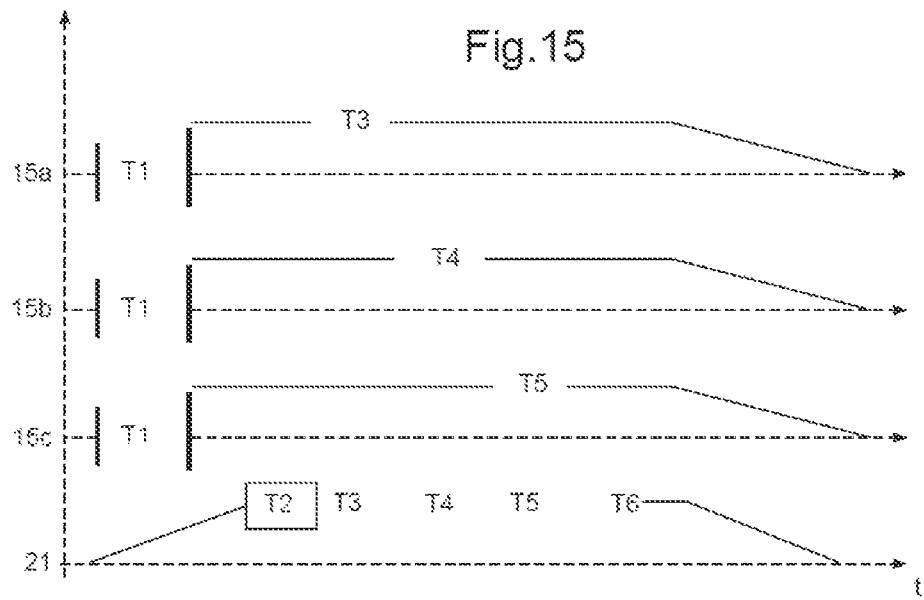

DATA TRANSFER SYSTEM AND ASSOCIATED MANAGEMENT METHOD

RELATED APPLICATIONS

Under 35 USC 119, this application claims the benefit of the priority date of French Patent Application 1152124, filed Mar. 15, 2011, the contents of which are herein incorporated by reference.

FIELD OF DISCLOSURE

The present invention relates to the field of data transfer systems and, more particularly, the distributed data transfer systems which comprise a plurality of peripheral devices intended to communicate with a central base via a radiofrequency communication.

BACKGROUND

In order to perform this data transfer, an energy source is necessary. In the prior art, the radiofrequency identification (RFID) technique is known and is represented in FIG. 1 in which the central base, also called reader 1, comprises an energy source, for example a battery 3, which enables the central base 1 to power a radiofrequency transmitter 5. The radiofrequency signals are sent to peripheral devices called tags 7 comprising an antenna 9. The radiofrequency signals are used to power the tags 7 and to recover data associated with the peripheral devices 7. However, the battery 3 of the central base 1 has to be regularly changed or recharged by an external energy source which can be a drawback in certain environments or for certain applications.

SUMMARY

The aim of the present invention is therefore to overcome the abovementioned drawbacks of the prior art and to propose a method and a system with which to optimize the management of the energy.

Thus, the present invention relates to a method for managing a data transfer system comprising
   a plurality of peripheral devices,
   a central base,
the data transfer system also comprising radiofrequency communication means enabling data to be transferred between the peripheral devices and the central base
in which
   energy is recovered on the peripheral devices, and
   at least a portion of the recovered energy is transferred to the central base via the radiofrequency communication means.

According to another aspect of the present invention, the peripheral devices comprise identification means and the data transferred between a peripheral device and the central base comprise an identifier of said peripheral device.

According to a supplementary aspect of the present invention, the peripheral devices comprise means for measuring at least one physical quantity, the data transferred between a peripheral device and the central base comprise at least one value of the at least one measured physical quantity and the central base comprises means for processing the transferred data corresponding to the at least one value of the at least one measured physical quantity.

According to another embodiment, the transfer of energy from the peripheral devices to the central base is performed by inductive coupling of the radiofrequency communication means.

According to an additional embodiment, the energy recovery comprises the conversion of energy available on the peripheral devices into electrical energy.

According to a supplementary aspect, the acquisition system comprises a central base comprising an antenna tuned to a predetermined frequency and the peripheral devices comprise a double-loop antenna having a zero mutual impedance, a first loop handling the transmission of a radiofrequency signal and a second loop handling the reception of a radiofrequency signal, the synchronization of the signals transmitted by the plurality of antennas comprising the following steps:
   when the process of communication from the peripheral device to the central base is triggered, a listening phase is implemented by the loop of the antenna configured to receive a radiofrequency signal in order to detect any radiofrequency signal transmitted by the central base,
      if a radiofrequency signal transmitted by the central base is detected, the peripheral device then uses the detected radiofrequency signal to transmit, to the central base, a signal that is synchronous and in phase with the detected radiofrequency signal,
      if no radiofrequency signal transmitted by the central base is detected, the peripheral device then transmits a radiofrequency signal at the predetermined frequency,
   when the central base receives a radiofrequency signal transmitted by a peripheral device at the predetermined frequency, it recovers the received radiofrequency signal and retransmits a radiofrequency signal at the predetermined frequency to the peripheral devices,
the synchronization of the radiofrequency signals enabling a simultaneous energy transfer from the peripheral devices to the central base without having any mutually destructive effect between the radiofrequency signals.

According to another embodiment, the generation by a peripheral device of a signal synchronous with a detected signal is performed by a shaping electronic circuit.

According to an additional embodiment, the generation by a peripheral device of a signal synchronous with a detected signal is performed by successive approximations by shifting the phase to find the resonance of the detected signal.

According to a supplementary embodiment, the transmission by a peripheral device of a signal at a predetermined frequency is performed by a local oscillator of the peripheral device.

According to another embodiment, the transmission by a peripheral device of a signal at a predetermined frequency is performed on the basis of a filtered electronic noise at the predetermined frequency.

According to an additional embodiment, the predetermined frequency is 13.56 MHz.

According to a supplementary embodiment, at a given instant, a single peripheral device transmits data to the central base.

According to another embodiment, the transmission of the data to the central base is done sequentially between the peripheral devices according to an anti-collision protocol.

According to an additional embodiment, the transfer of at least a portion of the recovered energy to the central base is performed when the quantity of energy recovered reaches a predetermined threshold.

According to a supplementary embodiment, the energy is stored on the peripheral devices.

According to another embodiment, the energy is stored on the central base.

According to an additional embodiment, the central base transmits a predetermined triggering signal to a peripheral device in order to trigger the acquisition of the data then transmits a signal to the peripheral device so as to recover the data acquired by radiofrequency identification.

The embodiments of the present invention also relate to a data transfer system comprising a plurality of peripheral devices, a central base, the data transfer system comprising radiofrequency communication means enabling the transfer of data between the peripheral devices and the central base, in which the plurality of peripheral devices comprises energy recovery means intended to supply, on the one hand, the plurality of peripheral devices and, on the other hand, the central base via the radiofrequency communication means.

According to another aspect of the present invention, the peripheral devices comprise identification means enabling an identifier of the corresponding peripheral device to be supplied, the communication means enabling said identifier to be transferred from the corresponding peripheral device to the central base.

According to an additional aspect of the present invention, the peripheral devices comprises means for measuring at least one physical quantity, the communication means allowing for the transfer of at least one value of the at least one measured physical quantity from the peripheral devices to the central base, and the central base comprises means for processing the transferred data corresponding to the at least one value of the at least one measured physical quantity.

According to another embodiment, the plurality of peripheral devices comprises a double-loop antenna in which a first loop is configured to transmit a radiofrequency signal, the second loop being configured to receive a radiofrequency signal, the first and second loops being configured to obtain a zero mutual impedance.

According to an additional embodiment, the double-loop antennas of the peripheral devices are configured so as to transmit a radiofrequency signal at a predetermined common frequency and in phase with one another.

According to a supplementary embodiment, the plurality of peripheral devices comprises means for storing the recovered energy.

According to another embodiment, the central base comprises means for storing the recovered energy.

According to an additional embodiment, the acquisition system corresponds to scales comprising peripheral devices arranged at the level of the position of the feet of the user on the scales, said peripheral devices comprising means for recovering the energy supplied by the presence of the user on the scales and means for measuring the force associated with the presence of the user, the central base comprising means for determining the weight of the user from the measurements supplied by the peripheral devices and means for displaying the determined weight.

According to a supplementary embodiment, the means for recovering the energy supplied by the presence of the user on the scales comprise a magnetic generator and the means for measuring the force associated with the presence of the user comprise strain gauges.

According to another embodiment, the acquisition system corresponds to a defibrillator comprising peripheral devices arranged in proximity to the heart of the user, said peripheral devices comprising means for recovering the energy supplied by the beats of the heart of the user, means for measuring the heart rate and means for applying an electrical discharge, the central base comprising means for determining, on the basis of the measurements of the heart rate supplied by the peripheral devices, the need to apply an electrical discharge.

According to an additional embodiment, the acquisition system is intended to monitor physiological constants of a person, the peripheral devices comprising means for measuring these physiological constants and means for recovering the energy supplied by the body of the person, the central base comprising means for saving and/or displaying the physiological parameters of the person.

According to a supplementary embodiment, the means for measuring the physiological constants of a person and the means for recovering the energy supplied by the body of a person comprise thermocouples.

Other features and advantages of the invention will emerge from the description thereof that will now be given, with reference to the appended drawings which represent, as a nonlimiting indication, a possible embodiment of the invention.

BRIEF DESCRIPTION OF THE DRAWINGS

In these drawings:

FIG. 1 represents a diagram of a data transfer system based on radiofrequency identification according to the prior art;

FIG. 2 represents a general diagram of a data transfer system according to the embodiments of the present invention;

FIG. 3 represents a diagram of a data transfer system according to the embodiments of the present invention;

FIG. 4 represents a diagram of a data transfer system according to an embodiment of the present invention;

FIG. 5 represents an exemplary embodiment of the communication means between the peripheral devices and the central base;

FIG. 6 represents an overall diagram of the transmission and reception modules of a peripheral device according to a first embodiment, FIG. 14 represents a diagram of the activity of the peripheral devices and of the central base during a data transfer from the peripheral devices to the central base according to a first process, FIG. 15 represents a diagram of the activity of the peripheral devices and of the central base during a data transfer from the peripheral devices to the central base according to a second process.

In all these figures, the same elements are given the same reference numbers.

DETAILED DESCRIPTION

Figure 7:
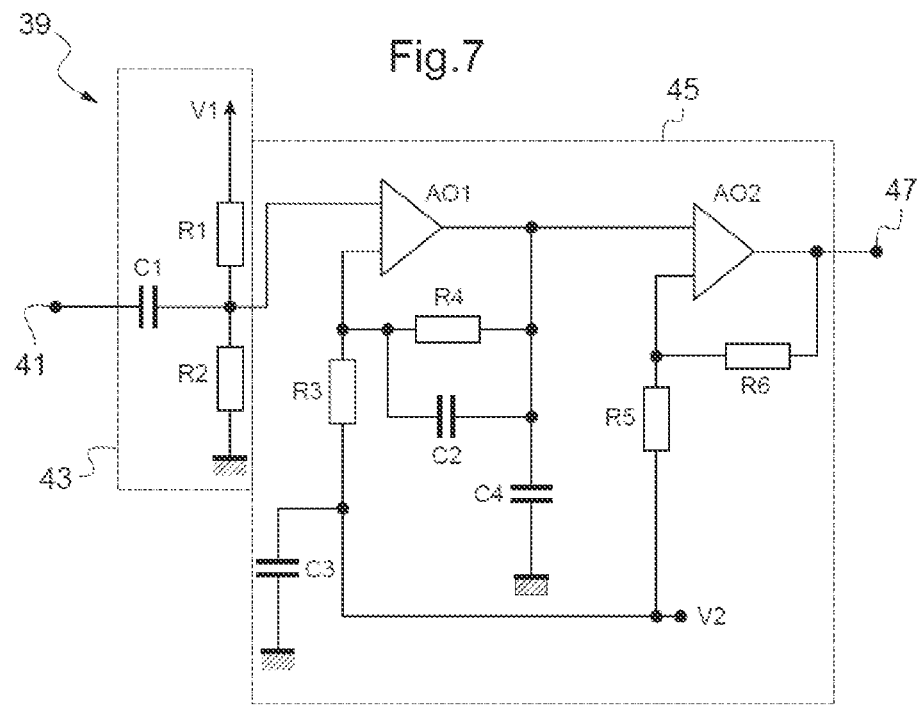
FIG. 7 represents a detailed diagram of an exemplary embodiment of a reception and amplification circuit of a peripheral device.

Hereinafter in the description, the term "RFID" is used as the acronym for radiofrequency identification.

The embodiments of the present invention relate to a data transfer system 13, represented generally in FIG. 2, comprising a plurality of peripheral devices 15 comprising energy recovery means 19 intended to supply, in particular, a central base 21 programmed to receive data transmitted by the peripheral devices 15 and perform a data processing. The data transfer system 13 also comprises radiofrequency communication means 24, the radiofrequency communication means 24 being intended to transmit the data 26 between the peripheral devices 15 and the central base 21 and allowing at least a portion of the energy recovered 28 on the peripheral devices 15 to be transmitted to the central base 21. The transfer of energy is performed by an inductive coupling of the radiofrequency signals 27 transmitted by the peripheral devices 15.

According to one aspect of the present invention, the peripheral devices 15 comprise identification means, for example a memory comprising an identifier, so that the data transfer comprises the transfer of the identifier associated with the peripheral device 15 to the central base 21.

According to another aspect of the present invention represented in FIG. 3, the peripheral devices 15 comprise means 17 for measuring a physical quantity and transmit the data corresponding to the measured values to the central base 21 via the communication means 24, the central base comprising means 18 for processing the measured values transmitted by the peripheral devices 15.

The measurement means 17 and energy recovery means 19 may be combined or may be separate, like the energy source and the physical quantity to be measured. Furthermore, the energy recovery means 19 recover the energy available in their environment, for example a motion, heat or radiation, etc., and convert that energy into electrical energy in order to transfer this energy to the central base 21 via the radiofrequency communication means 24.

According to a first embodiment represented in FIG. 4, the central base 21 is passive and comprises an antenna 25. The peripheral devices 15, of which there are three, comprise means for storing the recovered energy such as, for example, a rechargeable battery 29. This energy is used on the one hand to power the measuring means 17 and on the other hand to power the communication means 24 and the passive central base 21.

The radiofrequency communication means 24 are represented in detail in FIG. 5 in the case of two peripheral devices 15. The communication means 24 comprise, on each peripheral device 15, a double-loop antenna 23. A first loop 31 connected to a transmission module 33 is configured to transmit radiofrequency signals 27 and a second loop 35 connected to a reception module 37 is configured to receive radiofrequency signals 27. In order to avoid disturbances between the signals transmitted and received, the double-loop antenna 23 is configured so as to obtain a zero mutual impedance between the two loops 31 and 35.

Furthermore, the central base 21 comprises an antenna 25 intended to receive the radiofrequency signals 27 transmitted by the peripheral devices 15 and to retransmit radiofrequency signals 27 to the peripheral devices 15, the retransmitted signals being the signals received and modified to insert data to be transmitted to the peripheral devices 15.

In order to transmit data, these radiofrequency signals 27 are modulated, for example by an amplitude or frequency modulation on the peripheral devices 15 and by a charge modulation on the central base 21. The carrier used for the modulation has a predetermined frequency, for example 13.56 MHz, to which the antennas 23 and 25 of the peripheral devices 15 and of the central base 21 are tuned.

Furthermore, in the present embodiment, the energy recovery means 19 are the same for all the peripheral devices 15 and are powered by a common energy source. The communication protocol with the central base 21 for transmitting the data corresponding to the measurements is initialized when the level of energy stored in the storage means 29 corresponds to a predetermined threshold or at a predefined instant by using internal clocks situated in the peripheral devices. Thus, the communication protocols of the peripheral devices 15 are established almost simultaneously.

In order to avoid a destructive effect from the different radiofrequency signals 27 originating from the different peripheral devices 15, synchronization of the transmission of these radiofrequency signals 27 is necessary.

Two distinct protocols can be used for such synchronization:

According to a first synchronization protocol, the initialization of the radiofrequency communication comprises the following steps:

when the process of communication between the peripheral device 15 and the central base 21 is triggered, the peripheral device 15 proceeds with a listening phase during which the loop 35 of the antenna 23 is configured to detect any radiofrequency signal 27 transmitted by the central base 21 at a predetermined frequency, 13.56 MHz for example, to which the antenna 25 of the central base is tuned,
  if a radiofrequency signal transmitted (in fact retransmitted) by the central base 21 is detected, the peripheral device 15 then uses this detected radiofrequency signal to generate and transmit, to the central base 21, a radiofrequency signal that is synchronous and in phase with the detected signal. The generation of the synchronous radiofrequency signal is performed, for example, by a shaping electronic circuit which is used to create a signal that is synchronous with the received signal.
  if no radiofrequency signal transmitted by the central base 21 is detected, the peripheral device then transmits a radiofrequency signal at the predetermined frequency, 13.56 MHz for example,
when the central base 21 receives a radiofrequency signal transmitted by a peripheral device 15 at the predetermined frequency, the central base 21 recovers the received radio frequency signal and retransmits a signal at the predetermined frequency to the peripheral devices 15.

Thus, all the radiofrequency signals 27 transmitted by the peripheral devices 15 are synchronized which allows for a simultaneous transfer of energy from the peripheral devices 15 to the central base 21 without having any mutually destructive effect between the radiofrequency signals 27.

The transmission by a peripheral device 15 of a radiofrequency signal 27 at a predetermined frequency can be performed by a local oscillator tuned to this frequency but may also be performed on the basis of noise by filtering this noise at the predetermined frequency.

An exemplary embodiment of the communication means 24 and, more particularly, of the transmission 33 and reception 37 modules that can be used to generate a signal synchronous with a received signal or with a predetermined wavelength is presented in FIG. 6.

The reception loop 35 of the antenna 23 is linked to a reception and amplification circuit 39, the circuit diagram of which is represented in FIG. 7.

The input 41 is linked to a zero-crossing detection circuit 43 comprising a capacitor C1 linked to the mid-point of a branch comprising two resistors R1 and R2 mounted in series. The resistor R1 is linked to a voltage potential V1 and the resistor R2 is linked to the ground. This zero-crossing detection circuit 43 makes it possible to "position" the signal at the centre of the amplification band in order to be amplified by the amplifier circuit 45.

The amplifier circuit 45 comprises a first and a second operational amplifiers AO1 and AO2 cascade-mounted by the positive input terminal of the second amplifier AO2, the positive input terminal of the first amplifier AO1 being linked to the mid-point of the zero-crossing detection circuit 43. A resistor R3 is connected between the negative input terminal of the amplifier AO1 and a voltage potential V2 linked to the ground via a capacitor C3. A resistor R4 in parallel with a capacitor C2 links the negative input terminal to the output terminal of the amplifier AO1, the output terminal of the amplifier AO1 being linked to the ground via a capacitor C4. A resistor R5 is mounted between the negative input terminal of the amplifier AO2 and the voltage potential V2. A resistor R6 is connected between the negative input terminal and the output terminal of the amplifier AO2. The signal amplified by the amplifier circuit 45 is then transmitted at the output 47 of the reception and amplification circuit 39 to the shaping circuit 49 on the one hand and to the control circuit of the switch 51 on the other hand.

Figure 8:
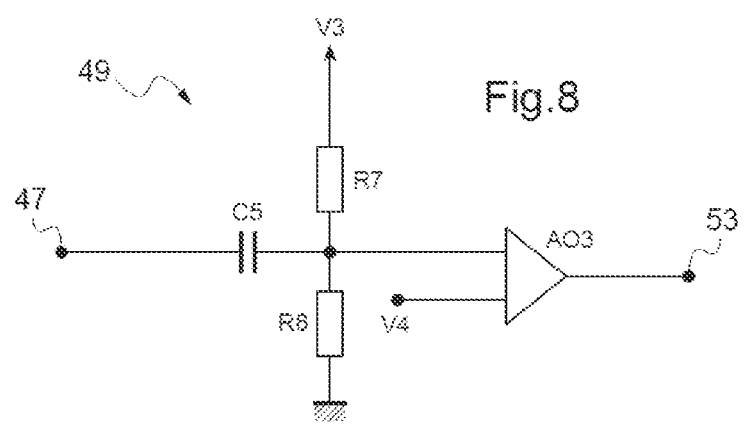
FIG. 8 represents a detailed diagram of an exemplary embodiment of a shaping circuit of a peripheral device.

The shaping circuit 49 is represented in FIG. 8 and comprises a capacitor C5 linked on the one hand to the input 47 of the shaping circuit and on the other hand to the mid-point of a branch comprising two resistors R7 and R8 mounted in series. The resistor R7 is linked to a voltage potential V3 and the resistor R8 is linked to the ground. The mid-point is linked to the positive input terminal of an operational amplifier AO3. The negative input terminal of the amplifier AO3 is linked to a voltage potential V4. At the output 53 of the shaping circuit 49, a square wave signal is obtained which is transmitted to the switch 55.

The control circuit 51 of the switch 55 is used to control the position of the switch 55 which can be linked to the output 53 of the shaping circuit 49 or to a local oscillator 57 depending on the reception or non-reception of a signal on the reception loop 35 of the antenna 23.

Figure 9:
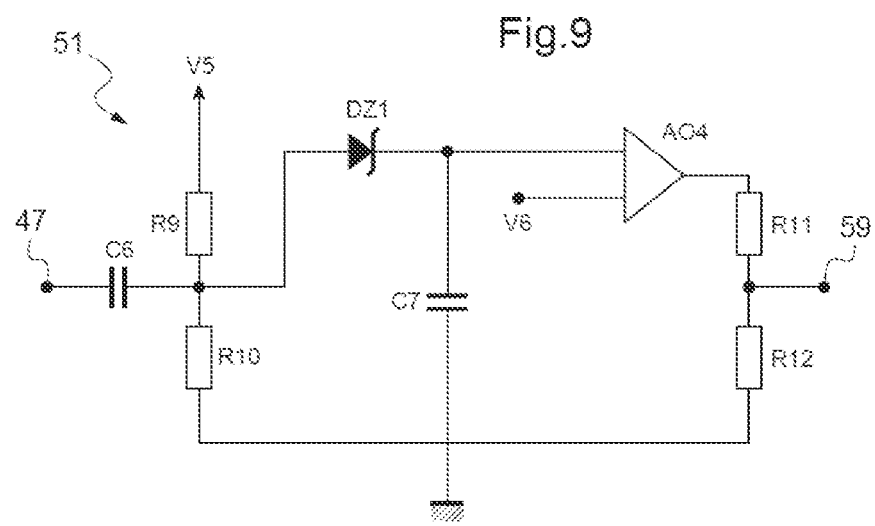
FIG. 9 represents a detailed diagram of an exemplary embodiment of a circuit for controlling a switch of a peripheral device.

The details of the control circuit 51 are represented in FIG. 9. The control circuit 51 comprises a capacitor C6 linked to the mid-point of a branch comprising two resistors R9 and R10 mounted in series, the resistor R9 being linked to a voltage potential V5 and the resistor R10 being linked to the ground. The mid-point is connected to a Zener diode DZ1 linked to the positive input terminal of an amplifier AO4 and to the ground via a capacitor C7. The negative input terminal of the amplifier AO4 is linked to a voltage potential V6 and the output terminal of the amplifier AO4 is linked to the ground via two resistors R11 and R12 mounted in series, the mid-point of which is the output terminal 59 of the control circuit 51. The voltage potential V6 corresponds to the detection threshold. The average voltage of the signal is thus compared to the threshold voltage V6 to determine the presence of a signal received on the reception loop 35. If a signal is received, the voltage at the output 59 of the control circuit 51 controls the connection of the switch to the output 53 of the shaping circuit 49, otherwise the switch is connected to the local oscillator 57.

Figure 10:
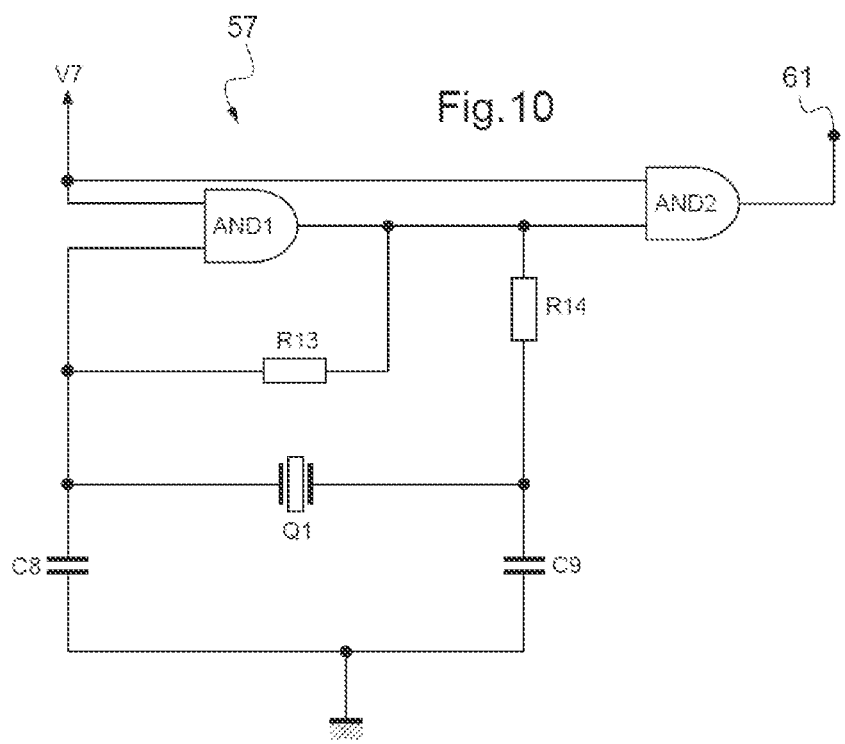
FIG. 10 represents a detailed diagram of an exemplary embodiment of a local oscillator of a peripheral device.

The local oscillator 57 can be modelled as represented in FIG. 10. The local oscillator comprises a quartz Q1 linked on one side to the ground via a capacitor C9 and to a resistor R14 linked to the output of an "AND" logic connector AND1 and on the other side to the ground via a capacitor C8 and to a first input terminal of the connector AND1. A resistor R13 links the first input terminal and the output terminal of the connector AND1. The second input terminal of the connector AND1 is linked to a voltage source V7 and to a first input terminal of an "AND" logic connector AND2. The output terminal of the connector AND1 is linked to the second input terminal of the connector AND2. The output terminal of the connector AND2 corresponds to the output 61 of the local oscillator 57, the signal created at the output 61 of the local oscillator 57 being sent to the switch 55.

Figure 11:
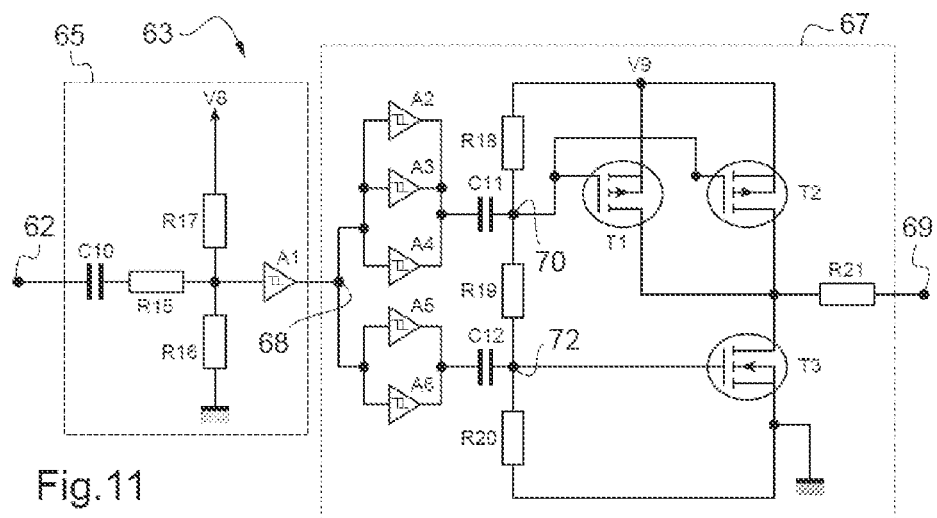
FIG. 11 represents a detailed diagram of an exemplary embodiment of a power amplifier of a peripheral device.

The output signal of the switch 55 (originating either from the shaping circuit 51 or from the local oscillator 57) is sent to the input 62 of a power amplifier 63, the details of which are represented in FIG. 11.

The power amplifier 63 comprises a first amplification stage 65 comprising a capacitor C10 mounted in series with a resistor R15 linked to the mid-point of a branch comprising a first and a second resistor R16 and R17 mounted in series, the first resistor R16 being linked to the ground and the second resistor R17 being linked to a voltage potential V8. The mid-point is also linked to a Schmitt trigger A1, the output of the Schmitt trigger A1 being linked to the input 68 of the second amplification stage 67. The input 68 is linked to a first branch comprising three Schmitt triggers A2, A3, A4 mounted in parallel, in series with a capacitor C11, said first branch being connected to a link point 70 and to a second branch comprising two Schmitt triggers mounted in parallel, in series with a capacitor C12, said second branch being connected to a link point 72. The link points 70 and 72 correspond to the intermediate points of a branch comprising three resistors R18, R19 and R20 in series, the link point 70 being situated between the resistors R18 and R19 and the link point 72 being situated between the resistors R19 and R20. The resistor R18 is connected to a voltage potential V9 and the resistor R20 is connected to the ground. Two p-type MOSFET transistors T1 and T2 have their gate linked to the link point 70, their source linked to the voltage potential V9 and their drain linked to a first terminal of a resistor R21. An n-type MOSFET transistor T3 has its gate linked to the link point 72, its source linked to the ground and its drain linked to the first terminal of the resistor R21, the second terminal of the resistor R21 being linked to the output 69 of the power amplifier 63.

At the output 69 of the power amplifier 63, the amplified signal is transmitted to a bandpass transmission filter 71 so as to select the desired frequency, for example 13.56 MHz.

Figure 12:
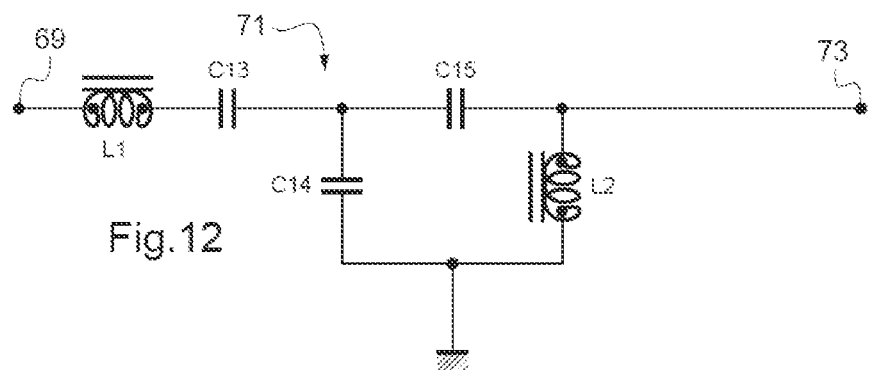
FIG. 12 represents a detailed diagram of an exemplary embodiment of a bandpass transmission filter of a peripheral device.

An example of a bandpass transmission filter 71 is described in FIG. 12. The input of the filter 71 corresponds to the output 69 of the amplifier 63 and is connected to a branch comprising an inductor L1 and two capacitors C13 and C15 mounted in series and linking the output 73 of the filter 71. A capacitor C14 in series with an inductor L2 are mounted in parallel with the capacitor C15. Furthermore, the connection between the capacitor C14 and the inductor L2 is linked to the ground.

The values of the inductors and of the capacitors make it possible to determine the cut-off frequencies of the filter and thus adjust the frequency that is to be transmitted.

Thus, the devices described can be used to transmit a signal that is synchronous and in phase with a received signal or to transmit a signal at a given frequency. Furthermore, the signal transmitted at a given frequency can be generated from noise, for example the electronic noise of the power amplifier, this noise being filtered to obtain the desired frequency for the transmitted signal, which makes it possible to dispense with the local oscillator 57.

According to a second synchronization protocol, the synchronization of the radiofrequency signals transmitted by the communication means of the peripheral devices 15 is obtained by searching for the resonance of the signal received by the antenna by successive approximations of a phase offset.

Figure 13:
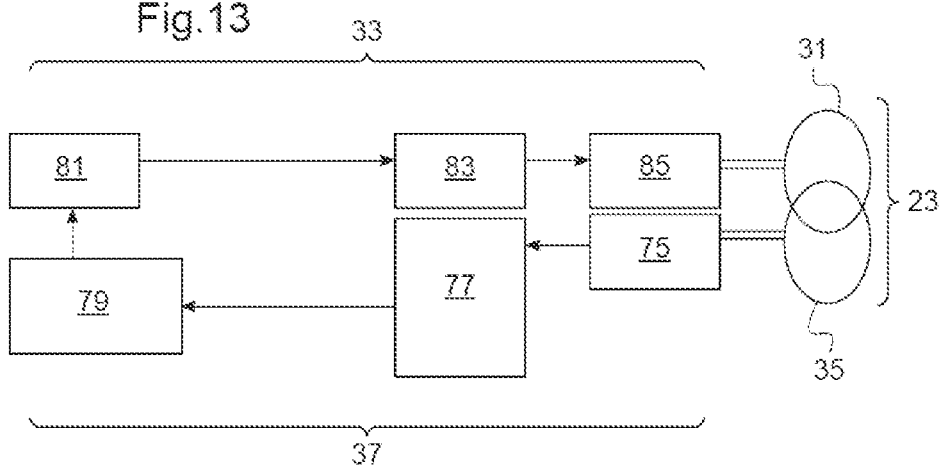
FIG. 13 represents an overall diagram of the transmission and reception modules of a peripheral device according to a second embodiment.

FIG. 13 represents an exemplary embodiment of the reception 37 and transmission 33 modules that can be used to obtain a synchronization by searching for the resonance.

The radiofrequency signal received on the reception loop 35 of the antenna 23 is transmitted to a reception circuit 75 so as to be demodulated and then is sent to a resonance analysis module 77 in which an analysis of the signal is used to determine its amplitude. Depending on the amplitude determined in the resonance analysis module 77, a signal is sent to a phase offset module 79 which will order an offset of the phase shift of the signal transmitted by the local oscillator 81. Thus, the phase of the signal is controlled as a function of the amplitude measured in the resonance analysis module 77. The adjustment of the phase is done, for example, by successive approximations (small phase offset), and makes it possible to tend towards the maximum resonance. The signal generated by the local oscillator is transmitted to a signal shaping circuit 83 and then to a transmission circuit 85 powering the transmission loop 31 of the antenna 23.

The search for the maximum resonance is continuous and the direction of the phase offset is determined on the basis of the measurement history: in case of a decrease in amplitude after a phase offset, the direction of the phase offset is reversed.

Thus, all the peripheral devices are synchronized with the resonance of a received signal, which makes it possible to obtain a mutual synchronization of the peripheral devices 15.

Once the signals from the different peripheral devices 15 have been synchronized, the peripheral devices 15 can transmit energy to the central base 21 without there being any destructive effect between the signals received at the central base 21. When the quantity of energy received is sufficient to activate the central base 21, the latter retransmits an activation signal (corresponding, for example, to a simple beep) by a charge modulation of the received signals to indicate to the peripheral devices 15 that they can now transfer data to it.

In order to avoid a loss of data, an anti-collision protocol is necessary. This anti-collision protocol makes it possible to prevent the peripheral devices 15 from transmitting data simultaneously. For this, time slots are allocated to the different peripheral devices 15, according, for example, to an identification number assigned at the time of manufacture or on initialization of the data transfer system 13. During a time slot, the peripheral device 15 whose identification number is associated with this slot can transmit a data frame to the central base 21.

Two alternatives are then possible depending on the operating mode of the central base:

If the energy supplied by a single peripheral device 15 is sufficient to enable the central base 21 to receive the data, then the different peripheral devices 15 each transmit a signal in turn during the time slot that is allocated to them, this signal making it possible both to supply energy to the central base 21 and to transmit the data corresponding to the measurements performed by the measurement means 17 of the peripheral device 15. Moreover, the duration of these time slots can vary according to the protocol chosen and may, for example, correspond to 10 or 20 ms.

A diagram representing the various data transmission steps in the case of three peripheral devices 15a, 15b and 15c and a central base 21 as a function of the time t is represented in FIG. 14.

The phase T1 common to all the peripheral devices 15 corresponds to the synchronization phase according to one of the synchronization protocols described previously. At the end of the synchronization phase, the central base 21 receives energy and when this energy reaches a predetermined threshold, the phase T2 corresponding to the return by the central base 21 of an activation signal to the peripheral devices 15 is initiated. On reception of the activation signal, the first peripheral device, here the peripheral device 15a, sends the data corresponding to its measurements during the phase T3, the phase T3 corresponding to a predetermined time slot enabling a peripheral device 15 to transfer the data corresponding to the measurements. Then, at the end of the phase T3, the second peripheral device 15b sends the data corresponding to its measurements during the phase T4. Then, at the end of the phase T4, the third peripheral device 15c sends the data corresponding to its measurements during the phase T5. After the phase T5, the phase T6 corresponds to the processing of the data by the central base 21; this processing may require more energy than the reception of the data so that all the peripheral devices 15 transmit a signal intended to transfer energy to the central base 21 during the phase T6. In the case where the energy from a single peripheral device 15 is sufficient to power the central base 21 during the processing of the data, only the third peripheral device 15c, for example, continues to transmit, in order to transmit energy during the phase T6. Once the phase T6 has ended, the central base 21 can, for example, send a deactivation signal to the peripheral devices 15 (still by charge modulation) to inform them of the end of the data processing in order for them to stop transmitting.

If the central base 21 requires the energy supplied by all the peripheral devices 15 to receive the data, all the peripheral devices 15 transmit signals enabling energy to be transmitted throughout the duration of the transmission of the data and the peripheral devices 15 each in turn send the data corresponding to the measurements performed by their measurement means 17.

A diagram representing the different data transmission steps in the case of three peripheral devices 15a, 15b and 15c and a central base 21 as a function of time t is represented in FIG. 15.

The phase T1 is common to the preceding embodiment and corresponds to the synchronization of the peripheral devices by one of the methods described previously. At the end of the phase T1, the peripheral devices 15a, 15b and 15c transmit a signal to transfer energy to the central base 21. When the energy level of the central base 21 is sufficient to receive data, the central base 21 retransmits an activation signal (phase T2). The first peripheral device 15a then transmits the data corresponding to its measurements (phase T3). At the end of the phase T3, the second peripheral device 15b transmits the data corresponding to its measurements (phase T4) then, at the end of the phase T4, the third peripheral device 15c transmits the data corresponding to its measurements. Furthermore, during the phases T3, T4 and T5, all the peripheral devices 15 (15a, 15b and 15c) continue to transmit in order to transfer energy to the central base 21. For the phase T6, the peripheral devices 15 continue to transmit in order to transfer energy to the central base 21 and enable the data to be processed. Once the data has been processed, the central base 21 may, for example, retransmit a deactivation signal to the peripheral devices 15 to inform them of the end of the processing of the data so that they stop transmitting.

Furthermore, the processing of the data may comprise, for example, a calculation to obtain the value of a predefined parameter, a back-up of the data and/or of a calculated parameter, display of the data and/or of a calculated parameter, etc.

Moreover, in order for the transmission of the data not to disturb the synchronization of the signals and therefore the transfer of energy to the central base 21, the signal modulation rate is limited (<100%).

According to a second embodiment, the central base 21 comprises means for storing the energy transmitted by the peripheral devices 15, such as for example a rechargeable battery. Thus, when the peripheral devices 15 recover energy, they then transmit at least a portion of this energy to the central base 21, which then stores this energy. This energy is used to power a standby mode of the central base 21 which triggers, in a programmable manner, a measurement acquisition cycle. The measurement acquisition cycle proceeds according to a radiofrequency identification (RFID) protocol in which the peripheral devices 15 act passively as transponders, the energy required by the peripheral devices 15 being supplied by the central base 21. Thus, in this embodiment, the signals are transmitted by the central base 21 and a charge modulation is performed on the peripheral devices 15 in order to retransmit the data corresponding to the measurements performed to the central base 21. This embodiment therefore makes it possible to use the standardized RFID communication protocols. However, this embodiment relies on a dual transfer of energy by inductive coupling which results in heavy losses.

In order to better understand the embodiments of the present invention, different applications of these embodiments will now be described in detail.

Figure 16:
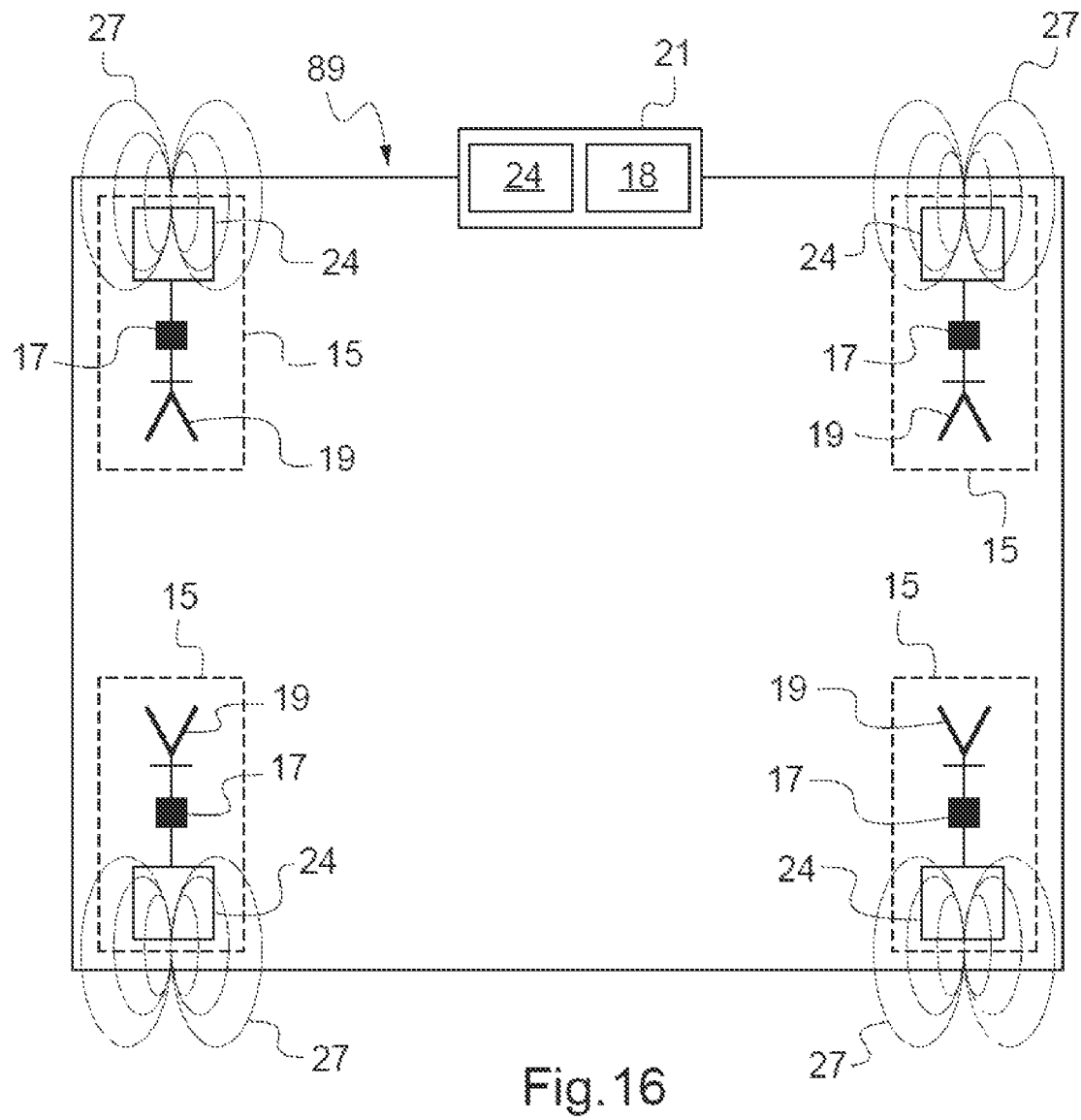
FIG. 16 represents a diagram of scales comprising a data transfer system according to the embodiments of the present invention.

A first application relates to scales 89 represented in FIG. 16, of which the peripheral devices 15 comprise means 17 for measuring the force created by the presence of a user on the scales 89. These measurement means are, for example, strain gauges situated on a proof body at the level of the feet of the user. The peripheral devices also comprise energy recovery means 19, for example a magnetic microgenerator in which the energy imparted by the presence of the user on the scales is transposed into a rotational motion then converted into electricity via an alternator, which make it possible to recover the energy supplied by the presence of the user. In the example of FIG. 16, the data transfer system, that is to say, the scales 89, comprises four peripheral devices 15 that are situated in front of and behind the position of the feet of the user on the scales 89 in order to recover a maximum of energy. The peripheral devices also comprise radiofrequency communication means 24, for example a transmission-reception electrical circuit as shown in FIG. 5 coupled to a double-loop antenna configured with zero mutual impedance enabling energy to be transferred to the central base 21.

The central base 21 comprises communication means 24 enabling the radiofrequency signals 27 transmitted by the peripheral devices 15 to be received and processing means 18 enabling the weight of the user to be determined on the basis of the data corresponding to the measurements from the strain gauges transmitted by the peripheral devices 15 and means for displaying this weight. Thus, when the user stands on the scales 89, his or her weight drives the microgenerator which creates an electrical voltage which is used to power on the one hand the strain gauges and on the other hand the radiofrequency communication means 24 and transfer energy to the central base 21. Furthermore, the weight of the user causes the strain gauges to be deformed, which makes it possible to determine the weight of the user. The radiofrequency signals 27 transmitted to the central base 21 then enable it to determine the weight of the user and to display this weight. Thus, such a scales 89 operates without the provision of external energy (battery or connection to the mains) and does not require any connecting cables between the strain gauges and the central base 21.

A second application relates to a defibrillator. Some people with cardiac problems require the use of an implanted defibrillator, in other words, an appliance which continuously monitors the beats of the heart and, when necessary, sends an electrical discharge to stimulate or regulate the heart, the measurement and stimulation electrodes being implanted directly on the heart. The present application consists in recovering a portion of the energy supplied by the beats of the heart, for example by piezoelectric or electromagnetic elements, in order to power on the one hand the electrodes for performing the heart rate measurements and on the other hand power radiofrequency communication means so that the result of the measurements can be transferred to a central base situated, for example, on the bed or the seat of the user. Furthermore, the recovered energy can also be used to recharge a battery intended to ensure the electrical discharge. However, in this application, a monitoring of the level of the battery intended to ensure the electrical discharge may be provided, as well as other means for recharging this battery in the case where the recharging by the peripheral devices is insufficient to generate an adequate electrical discharge.

The measurements of the heart rate may thus be transferred continuously to the central base which may, for example, display these data in the form of a plot and determine whether or not an electrical discharge needs to be sent, for example if the heart rate exceeds a predetermined threshold.

Thus, by recovering the energy supplied by the beats of the heart, the present application makes it possible to do away with the presence of cables between the implanted electrodes and the central base and thus improve the comfort of the user.

Furthermore, the implanted electrodes can be used during hospital examinations by using an external radiofrequency antenna.

A third application relates to a device for monitoring physiological constants of a person situated, for example, in a hospital bed, the peripheral devices comprising means for measuring the physiological constants such as, for example, the voltage, the heart rate, the temperature, etc., and means for recovering the energy associated with the environment of these measurements such as, for example, the recovery of the heat energy by thermocouples, of the mechanical energy associated with the internal and external movements of the body of the person by piezoelectric elements. The recovered energy thus makes it possible to power the sensors and communicate with the central base. The central base may be composed, for example, of a device consisting of a relay antenna capable of receiving the data from the peripheral devices and of saving these data, this device being situated in proximity to the patient, for example on his or her clothing, the data stored by the central base being recovered by a reader of RFID type external to the data transfer system. Moreover, the data can also be saved in the measurement means.

The embodiments of the present invention therefore make it possible to use the peripheral devices of a network of sensors such as microgenerators capable of being self-powered and of powering a central base handling the processing of the data measured by the sensors while doing away with cables between the peripheral devices and the central base. Such embodiments make it possible to optimize the use of the energy supplied by the environment of the data transfer system and to envisage locating data transfer systems in environments that are difficult to access.

The invention claimed is:

1. A method for managing a data transfer system including a plurality of peripheral devices, a central base, and radio-frequency communication means for enabling data to be transferred between said peripheral devices and said central base, said central base including an antenna tuned to a predetermined frequency, said peripheral devices each having a double-loop antenna, said double-loop antenna having a first loop handling transmission of a radio-frequency signal and a second loop handling reception of a radio-frequency signal, said first and second loops configured to have zero mutual impedance therebetween, said method comprising at said peripheral devices, recovering energy, transferring at least a portion of said recovered energy to said central base via said radio-frequency communication means, and synchronizing radio frequency signals transmitted by said double-loop antennas, wherein synchronizing radio frequency signals includes in response to triggering of communication from a peripheral device to said central base, implementing a listening phase using a second loop to detect a radio-frequency signal transmitted by said central base, and at least one of in response to detecting a radio-frequency signal transmitted by said central base, causing said peripheral device to use said detected radio-frequency signal to transmit, to said central base, a radio-frequency signal that is synchronous and in phase with said detected radio-frequency signal, and in response to detecting an absence of a radio-frequency signal transmitted by said central base, causing said peripheral device to transmit a radio-frequency signal at said predetermined frequency, and wherein synchronization further includes, in response to receiving a radio frequency signal transmitted by said peripheral device at said predetermined frequency, causing said central base to recover said received radio-frequency signal and to re-transmit a radio-frequency signal at said predetermined frequency to said peripheral devices, whereby said synchronization of said radio-frequency signals enables a simultaneous energy transfer from said peripheral devices to said central base while avoiding mutually destructive effects between said radio-frequency signals.

2. The method of claim 1, wherein said peripheral devices comprise identification means, said method further comprising transferring data between a peripheral device and said central base, said data including an identifier of said peripheral device.

3. The method of claim 1, wherein said peripheral devices comprise means for measuring a physical quantity, said method further comprising transferring data between a peripheral device and said central base, said data including data representing a value of said measured physical quantity, and, at said central base, processing said transferred data corresponding to said value of said measured physical quantity.

4. The method of claim 1, wherein transferring at least a portion of said recovered energy to said central base via said radio-frequency communication means comprises inductive coupling of said radio-frequency communication means.

5. The method of claim 1, wherein recovering energy on said peripheral devices comprises converting energy available on said peripheral devices into electrical energy.

6. The method of claim 1, wherein causing said peripheral device to use said detected radio-frequency signal to transmit, to said central base, a radio-frequency signal that is synchronous and in phase with said detected radio-frequency signal comprises generating said signal with a shaping electronic circuit.

7. The method of claim 1, wherein causing said peripheral device to use said detected radio-frequency signal to transmit, to said central base, a radio-frequency signal that is synchronous and in phase with said detected radio-frequency signal comprises successive approximations by shifting said phase to find said resonance of said detected signal.

8. The method of claim 1, wherein causing said peripheral device to transmit a radio-frequency signal at said predetermined frequency comprises generating said signal using a local oscillator of said peripheral device.

9. The method of claim 1, wherein causing said peripheral device to transmit a radio-frequency signal at said predetermined frequency comprises generating said signal on said basis of a filtered electronic noise at said predetermined frequency.

10. The method of claim 1, further comprising selecting said predetermined frequency to be 13.56 MHz.

11. The method of claim 1, wherein, at a given instant, at most a single peripheral device transmits data to said central base.

12. The method of claim 11, further comprising transmitting data to said central base according to an anti-collision protocol.

13. The method of claim 1, wherein transferring at least a portion of said recovered energy to said central base comprises transferring said recovered energy in response to determining that a quantity of recovered energy has at least reached a predetermined threshold.

14. The method of claim 1, further comprising storing said energy on said peripheral devices.

15. The method of claim 1, further comprising storing said energy on said central base.

16. The method of claim 15, further comprising causing said central base to transmit a predetermined triggering signal to a peripheral device in order to trigger said acquisition of said data and causing said central base to transmit a signal to said peripheral device so as to recover data acquired by radio-frequency identification.

* * * * *